Feb. 10, 1931.  A. B. COWLES  1,791,956
BIRD HOUSE OR SIMILAR STRUCTURE
Filed Nov. 25, 1927  3 Sheets-Sheet 1
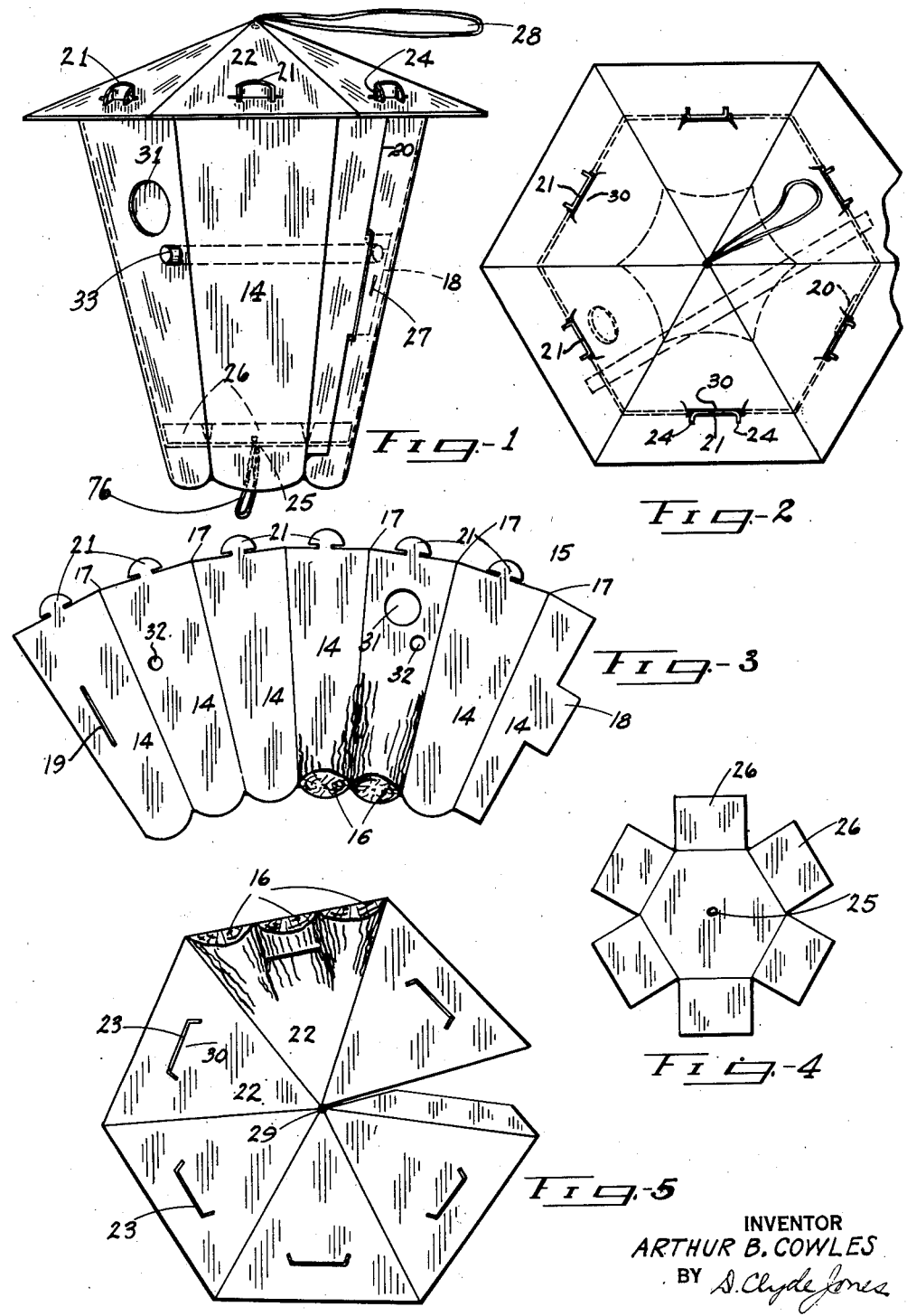
INVENTOR
ARTHUR B. COWLES
BY  S. Clyde Jones
ATTORNEY

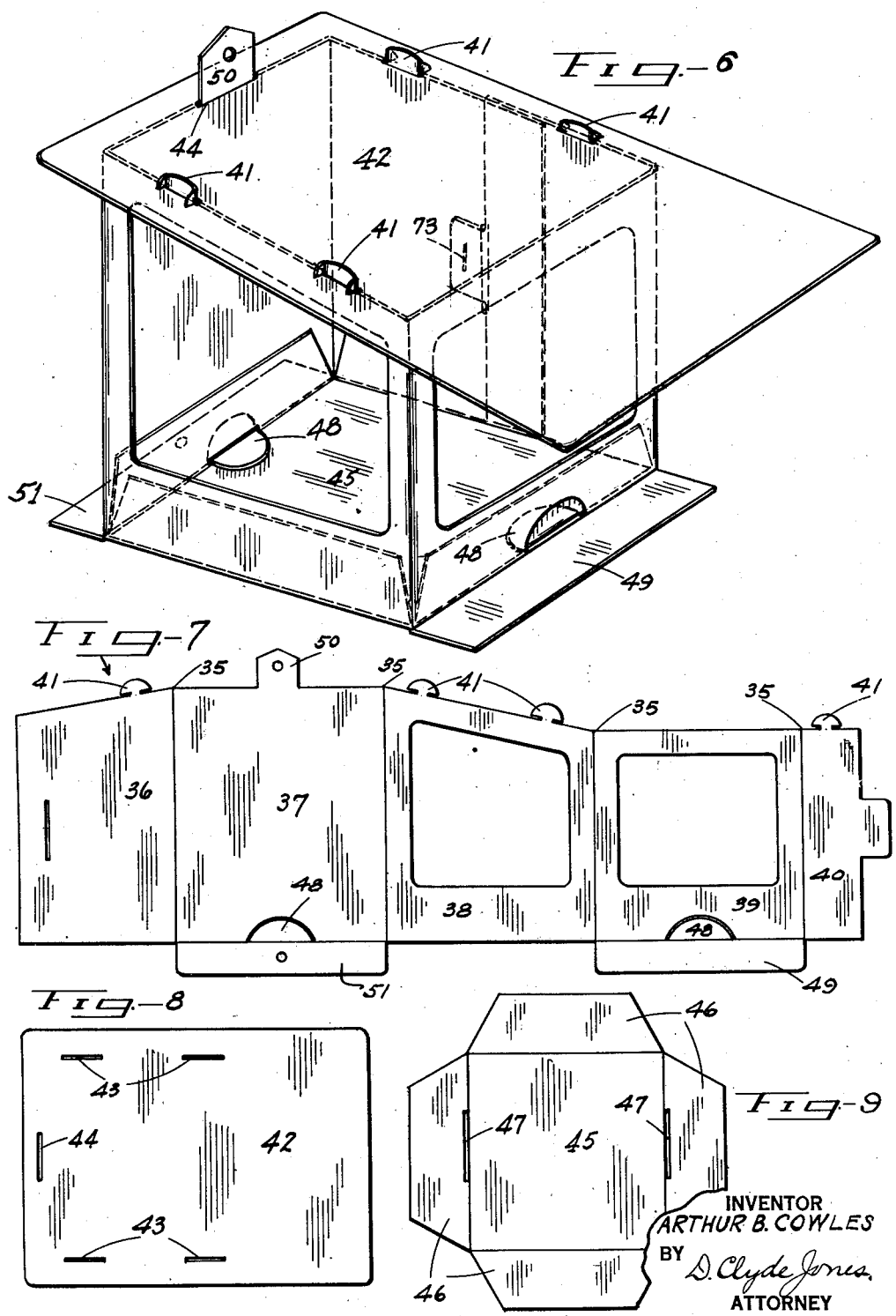

Feb. 10, 1931.  A. B. COWLES  1,791,956
BIRD HOUSE OR SIMILAR STRUCTURE
Filed Nov. 25, 1927  3 Sheets-Sheet 3
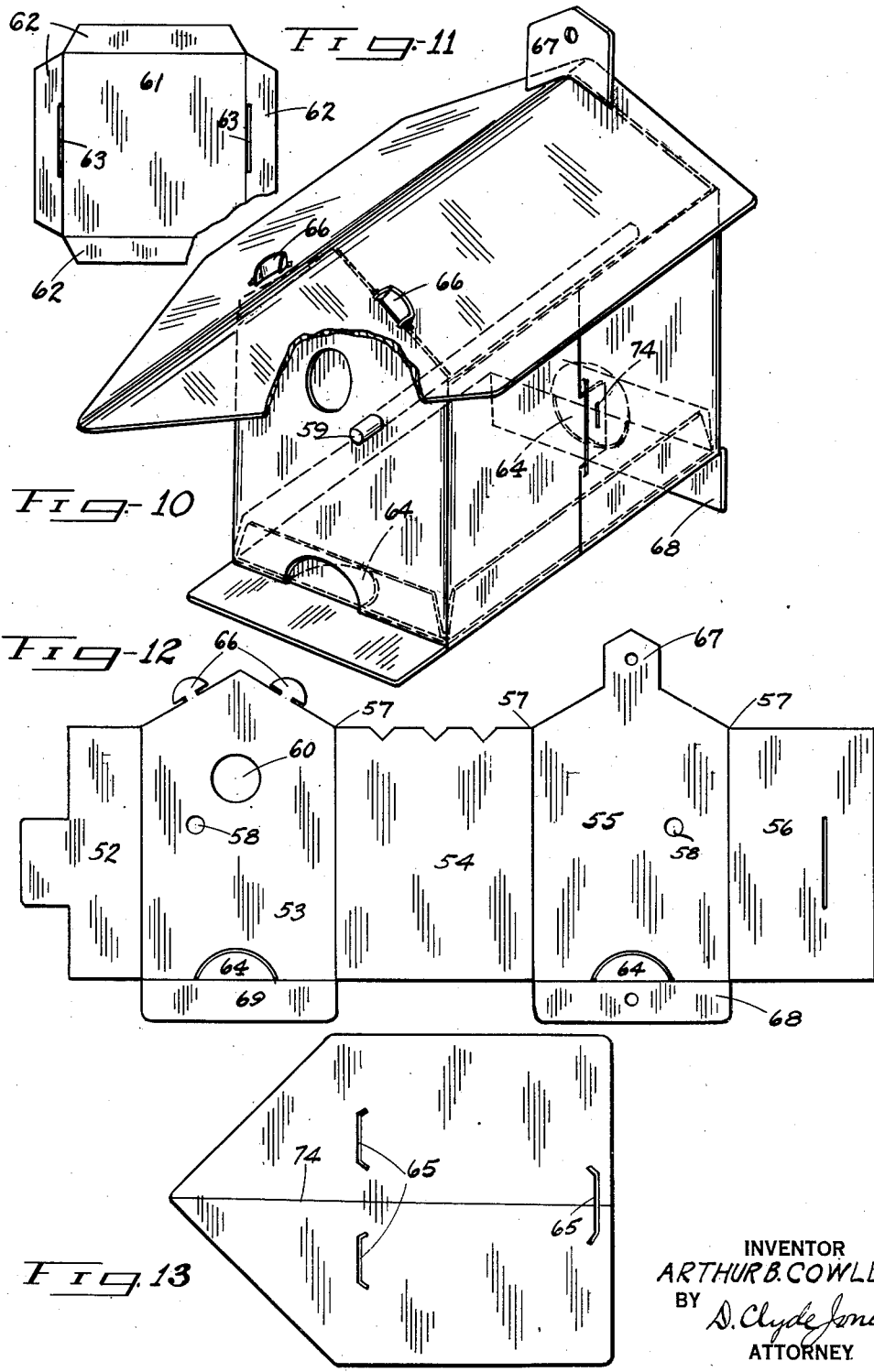
INVENTOR
ARTHUR B. COWLES
BY D. Clyde Jones,
ATTORNEY Patented Feb. 10, 1931

1,791,956

UNITED STATES PATENT OFFICE

ARTHUR B. COWLES, OF ROCHESTER, NEW YORK

BIRD HOUSE OR SIMILAR STRUCTURE

Application filed November 25, 1927. Serial No. 235,528.

This invention relates to bird houses or similar structures and more particularly to bird houses of knock-down construction type.

In the past it has been customary to build bird houses of slabs or strips of wood with the bark left on their exposed surface or else finished to simulate the appearance of bark.

In accordance with the present invention a bird house is produced from stamped sheet material which is simple to manufacture, which is of knock-down construction so that it will require minimum space for shipment, and which is so inexpensive that it can be discarded at the end of each mating season, thereby obviating the necessity of cleaning the bird house as in the case where expensive wood construction is employed.

One of the main features of the present invention is the production of a bird house stamped of sheet material and properly scored so that it is easily assembled and locked in assembled position.

A further feature of the invention is the use of sheet material printed or embossed to simulate the appearance of rough wood and waterproofed to withstand adverse climatic conditions.

Another feature of the invention is the arrangement of parts whereby a bird house of sheet material may be locked in assembled condition to provide a substantially rigid structure.

Other features of the invention will appear from the detailed description and the appended claims.

For a clearer understanding of the invention reference is made to the drawings in which Fig. 1 is a side view of one type of assembled bird house while Fig. 2 is a top view of the same structure. Figs. 3, 4 and 5 represent the blanks employed in forming the structure of the first two mentioned figures. Fig. 6 is a perspective view of a different design of bird house while Figs. 7, 8 and 9 are plan views of the blanks utilized in forming the structure of this design. Fig. 10 represents a still different modification of the invention showing a perspective view of a different type of bird house formed of the blanks shown in plan view in Figs. 11, 12 and 13.

In the preferred modification shown in Fig. 1, a hexagonal bird house is formed of a blank generally designated 15 struck out from water-proofed pasteboard which has been printed or embossed to represent bark or other rough wood finish as indicated at 16. This blank consists of seven sections 14 separated by lines of scoring 17 of which the two end sections are provided with a tongue 18 and a slot 19 arranged to hold these sections in overlapping relation as shown at 20 in Figs. 1 and 2 when the blank is folded for use and six of these sections are provided with tabs 21 to lock to the roof, the sections forming the sides. The roof is formed of a waterproofed pasteboard blank ornamented to represent bark or rough wood as shown in Fig. 2 and consists of six triangular sections such as 22 each of which is provided with a slit 23 through which the tabs 21 may be inserted to lock the side sections and roof sections in assembled position as shown in Figs. 1 and 2. The floor of this design is formed of a pasteboard blank shown in Fig. 4 and consists of a body portion 25, hexagonal in shape, each side of which is provided with extensions 26 which frictionally engage the side sections 14. The floor carries a supporting string 76.

In assembling this structure the side sections 14 are folded along the lines of scoring 17 and the tongue 18 is inserted in the slot 19 after which a staple or other suitable rivet 27 is fastened through the overlapping sections to hold the sides of the structure locked in assembled position. Even with the side sections thus fastened in overlapping relation, the side portions may be collapsed on two diametrically opposite lines of scoring so that the side section may be folded flat for shipment. In assembling the floor for use the extensions 26 are folded on the line of scoring where they join the hexagonal body portion 25 after which it is inserted within the side sections and forced downward with the tabs 26 frictionally engaging the side sections 14 so that the bottom is wedged against the inner surface of these sections. In assembling the roof the triangular sections are formed by folding the blank of Fig. 5 along the lines of scoring and if desired a supporting loop of string 28 is inserted in the opening 29 and knotted so that the string will not slip through the opening. The roof is mounted on the side sections by inserting the tabs 21 through the slots 23 and then bending the side portions 24 of the tabs at right angles to lock the roof and side sections together. It will be noted that the slots 23 are substantially U-shaped so that the portion 30 defined thereby forms a resilient portion whose edge frictionally engages its associated tab to lock it in assembled position. It will also be seen that one of the side sections is provided with an opening 31 of sufficient size to permit the entrance of birds which the structure is intended to house but small enough to prevent the entrance of undesired birds. It will further be noted that two smaller openings 32 are provided in two sections which are diametrically opposite when the structure is assembled, to receive a rod or perch 33 which extends through the openings 32, having one end projecting adjacent the entrance 31. Since this perch is of rigid material it serves to give rigidity to the bird house in its assembled condition.

The modified form of the invention disclosed in Figs. 6, 7, 8 and 9, shows a bird shelter of the type commonly known as a robin house. In this modification, the structure is rectangular and has enlarged openings or windows in two of its sides. These sides are formed from a blank of water-proofed pasteboard shown in Fig. 7 consisting of five sections defined by lines of scoring 35, designated 36 to 40 inclusive provided with tabs 41 for locking the side sections to the water-proofed roof blank (Fig. 8) by engaging the slots 43 therein. The sections 38 and 39 are provided with two large openings or windows through which the birds may have access to the interior of the house. The bottom of this bird house is formed from a blank as shown in Fig. 9 properly scored to form a rectangular body portion 45 and side extensions 46 and is provided with slots 47 to receive tongues 48 on the side sections 37 and 39 to lock the sides and bottom together. The section 39 is also provided with an extension 49 which may be folded to extend parallel to the bottom to serve as a perch and also to present a finished appearance while section 37 is provided with an apertured tab 50 which passes through a slot 44 in the roof to serve as one point of support for the house. The lower portion of this section is also provided with an apertured extension 51 which serves as a second point of support for the bird house. In this design the exposed portions may be decorated to represent bark or rough wood.

In assembling the structure as shown in Fig. 6 the side sections are formed by folding on the lines of scoring and the tab on section 40 is inserted in the slot in section 31 in which position it is locked by a staple or rivet 73. The bottom blank is also folded on the line of scoring after which it is inserted within the sides where it is locked in this position by the tongues 48 in sections 37 and 39 engaging with the slots 47 in the bottom blank. After this the roof blank 42 is mounted on the side sections with the tab 50 passing through the slot 44 and the tongues 41 engaging the slots 43. In order to lock the side sections and roof together the tongues 41 have portions bent at right angles to the main part thereof.

The modification disclosed in the Figs. 11 to 13, shows a house of slightly different external appearance in which the sides are formed from a single blank of water-proofed material properly shaped and scored as shown in Fig. 12. This blank includes sections 52, 53, 54, 55 and 56 separated by lines of scoring such as 57. The sections 53 and 55 have portions which form the gables of the house and these sections are also provided with apertures 58 to receive a rigid rod or perch 59. Section 53 also has an opening 60 which serves as an entrance into the house. The bottom or floor of this house is formed from a blank shown in Fig. 11 having a body portion 61 and side extensions 62 and is also provided with slots 63 in which tabs 64 on the side portions are inserted to lock the sides and bottom together. The roof is formed of a blank of water-proofed material shown in Fig. 13 scored on the line 74 and provided with slots 65 to receive the tongues 66 and the apertured supporting tab 67. It will be noted that the side portions of the tongue 66 are bent at right angles to the main body portion thereof and thereby serve to lock the roof and side sections together and the slots 65 are U-shaped to define a resilient portion which engages the main portion of the tongue 66. The side section 55 is also provided with an apertured portion 68 which serves as a second point of support for the house and section 53 is also provided with a portion 69 which may be folded parallel to the bottom to serve as an additional perch on the front of the house. In this design a portion of the roof extends over the perch to protect the entrance from rain and also to shelter a bird resting on the perch outside of the house. All exposed portions of this design are likewise decorated to represent bark or rough wood.

In assembling this modification, as shown in Fig. 10, the side blank is folded on the line of scoring after which the tongue on section 52 is inserted in the slot in section 56 where it is locked by a staple or rivet 74. The bottom blank is then formed by folding on the lines of scoring after which it is inserted in the side sections where it is locked by the tabs 64 which are inserted in the slots 63. The roof blank is then folded on line 74 after which it is mounted on the side sections by the tab 67 inserted in the slot 65 and tabs 66 inserted in the slots 65 after which the tabs 66 are bent as shown in Fig. 10 to lock the sides and roof together.

While the structures of this invention have been described as being formed of waterproofed pasteboard, it will be understood that any other material suitable for stamping the blanks may be used.

It will also be understood that any resilient material suitable for supporting the structure of Fig. 1 between adjacent limbs of a tree may replace the supporting strings shown in this disclosure.

What I claim, is:

1. A bird house formed of three blanks of water-proofed sheet material constituting the sides, roof and floor thereof, said sides when folded defining the general contour of an inverted truncated pyramid, interlocking means for holding the roof and sides together, a bottom having extensions extending at an angle thereto engaging the inner surface of said sides whereby the movement of the bottom downward tends to wedge it against said sides, one of said sides having an opening serving as an entrance, and a rigid perch adjacent said opening and extending through two opposite sides to give rigidity to the structure.

2. A bird house formed of bottom, side and roof blanks of water-proof sheet material arranged to be shipped in flat knockdown form, said bottom consisting of a polygon provided with extensions defined by lines of scoring, said side consisting of truncated triangles defined by lines of scoring and having two edges fastened in overlapping relation, said side having an opening therein serving as an entrance and other openings in two opposite triangular portions thereof to support a perch adjacent said entrance, said roof consisting of a blank scored to define a number of triangles, two edges of said blank being adapted to be folded in overlapping relation, and interengaging means on said side blank and said roof blank to hold the edges of the roof blank in overlapping relation.

In witness whereof, I hereunto subscribe my name this 22nd day of November A. D. 1927.

ARTHUR B. COWLES.